(12) United States Patent
Kim

(10) Patent No.: US 6,336,727 B1
(45) Date of Patent: Jan. 8, 2002

(54) POINTING DEVICE KEYBOARD LIGHT

(75) Inventor: Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/604,950

(22) Filed: Jun. 27, 2000

(51) Int. Cl.[7] .......................... G01D 13/26; G09G 5/08
(52) U.S. Cl. .......................... 362/23; 362/85; 362/253; 345/161; 345/168
(58) Field of Search .................... 200/315; 345/157, 345/161, 168, 170, 184; 361/680, 683; 362/23, 85, 109, 253, 33

(56) References Cited

U.S. PATENT DOCUMENTS

| | | | |
|---|---|---|---|
| 3,711,669 A | * 1/1973 | Keranen | 200/315 |
| 4,626,965 A | 12/1986 | Gupta et al. | 362/33 |
| 4,772,769 A | 9/1988 | Shumate | 200/314 |
| 5,034,602 A | 7/1991 | Garcia, Jr. et al. | 250/227.22 |
| 5,615,945 A | * 4/1997 | Tseng | 362/253 |
| 5,684,513 A | 11/1997 | Decker | 345/168 |
| 5,708,562 A | 1/1998 | Agata et al. | 361/683 |
| 5,801,681 A | * 9/1998 | Sayag | 345/157 |
| 5,815,225 A | 9/1998 | Nelson | 349/665 |
| 5,864,334 A | 1/1999 | Sellers | 345/168 |
| 5,936,554 A | 8/1999 | Stanek | 341/22 |
| 6,005,490 A | * 12/1999 | Higashihara | 345/170 |
| 6,057,540 A | * 5/2000 | Gordon et al. | 345/161 |
| 6,161,944 A | * 12/2000 | Leman | 362/253 |
| 6,232,959 B1 | * 5/2001 | Pedersen | 345/161 |

FOREIGN PATENT DOCUMENTS

JP 08-314598 11/1996 ............. G06F/3/02

OTHER PUBLICATIONS

IBM–TDB—vol. 32, No. 5B Oct. 1989 pp. 474–477 "Electroluminescent Keyboard Lamp".

\* cited by examiner

*Primary Examiner*—Alan Cariaso
(74) *Attorney, Agent, or Firm*—Floyd A. Gonzalez; James E. Murray

(57) ABSTRACT

A lighting source, such as a light emitting diode (LED), is incorporated into the shaft of the pointing device. There is a light shield over the exposed top of the pointing device preferably, backed with a conically shaped reflecting surface to direct the light outwardly and horizontally across the keyboard. The light is activated in a laptop by opening the cover to raise the pointing device to its normal operating position. The lighting function may be disabled when the pointer is raised if there is sufficient ambient lighting.

16 Claims, 4 Drawing Sheets

POINTING DEVICE KEYBOARD LIGHT

FIELD OF THE INVENTION

The present invention relates to keyboard lighting and more particularly, to incorporating a lighting device into the keyboard of a portable computer.

BACKGROUND OF THE INVENTION

Either back or front lighting can be used to illuminate a full travel keyboard in a dimly lit ambient environment. Back lighting requires that an incandescent light bulb or a light-emitting diode (LED) light source be placed inside the keyboard. When power is applied, the light source illuminates by transmission from the rear the legends on the key caps of the keyboard. Front lighting requires that a light source, typically with an adjustable brightness incandescent light bulb, be place above the keyboard. When power is applied, light from the lamp illuminates by reflection off the legends on the key caps.

Each keyboard-lighting technique has advantages and disadvantages. Back lighting has the advantage in that it is integrated with the keyboard to eliminate annoying vision obstructions onto and behind the keyboard. In back lighting, each key is illuminated to avoid finger shadows on the key caps and provide good key cap legend readability. Also, the brightness of the keyboard can be easily adjusted to avoid display reflections and suit different lighting conditions and user preferences.

However, back lighting has disadvantages in that the keyboard itself is usually thicker to accommodate light source and other support electronics. Back lit keyboards are also quite expensive due to low volume and unusual, customized electronics. They suffer from low reliability due to electronic complexity and require a relatively large amount of power.

Front lighting has an advantage in that it is much lower in cost to implement. However, prior art front lighting also has disadvantages. Among them being that the lamp usually obstructs the user's view of the computer screen and possibly access to keys on the keyboard because the lamp is usually positioned above the keyboard in the user's line of sight.

For the above reasons and other reasons, prior art back lighting or front lighting techniques have provided optimal keyboard lighting technique.

Therefore, it is an object of the present invention to provide a new electroluminescent keyboard light.

It is another object of the present invention to provide a keyboard level light source.

Further objects of the invention is to provide a light source for a computer keyboard that is inexpensive, efficient and easy to operate.

BRIEF DESCRIPTION OF THE INVENTION

In accordance with the present invention, a lighting source, such as a light emitting diode (LED), is incorporated into the shaft of a pointing device positioned among the keys of a keyboard. A light shield or cap is attached to the top of the pointing device so that the light from the light source extends outwardly and horizontally across the keyboard to provide light to the keyboard without interfering with the viewing of the computer screen. Reflecting surfaces can be incorporated into the underside of the cap and at the base of the light source to intensify the light provided to the keyboard. The light is activated when the pointing device is raised to its normal operating position. When ambient lighting is sufficient, the lighting function may be disables when the pointed is raised.

BRIEF DESCRIPTION OF THE DRAWINGS

The invention and its objects, features and advantages can best be understood by reading the following description of the preferred embodiments while referring to the accompanying figures of which.

DETAILED DESCRIPTION OF THE INVENTION

Figure 1:
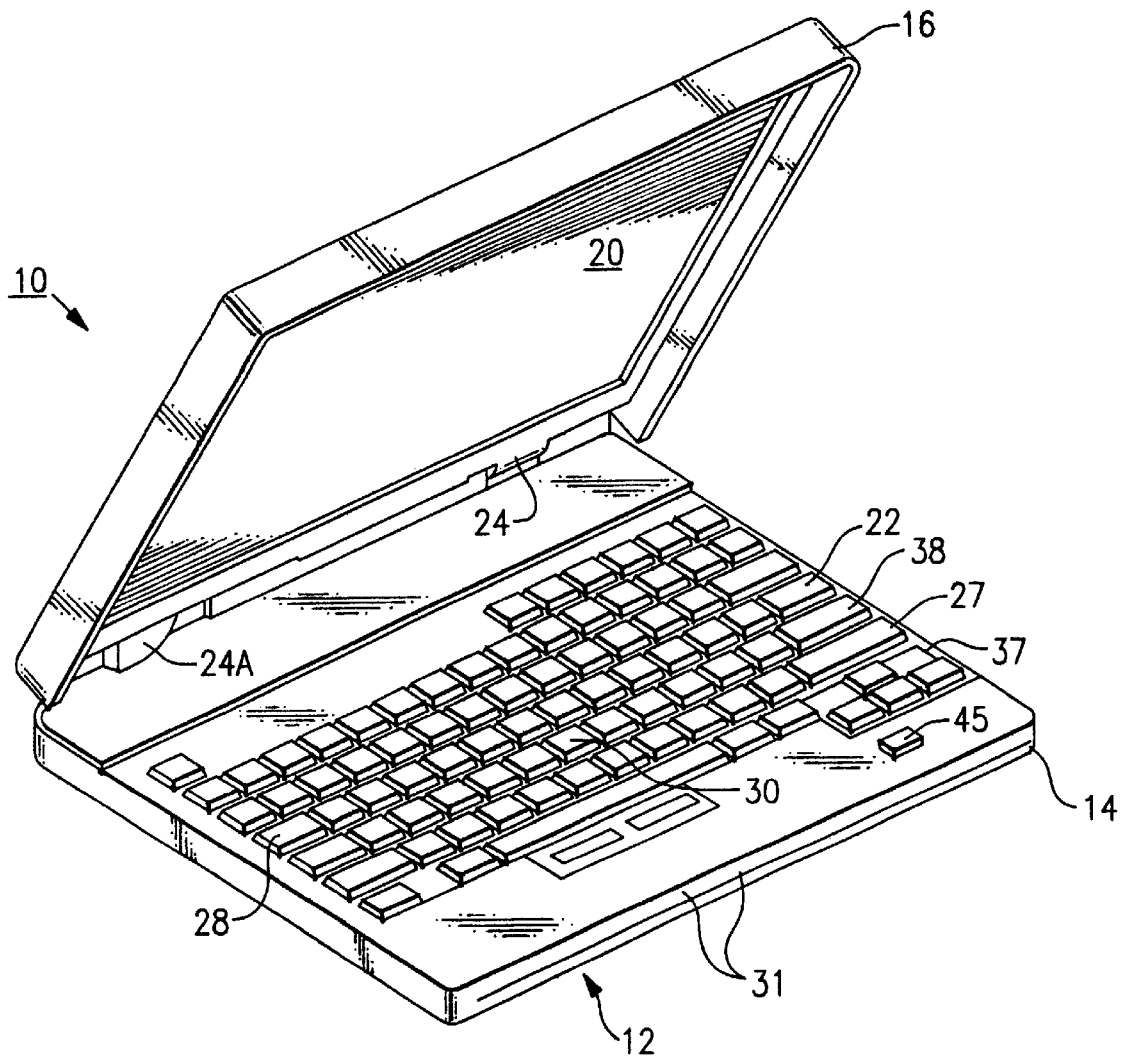
FIG. 1 is a perspective view of a portable PC with its cover.

Referring to FIG. 1, a laptop computer 10 comprises a lower case 14, a cover 16, an electronic circuit 18 in the lower case 14 and a display 20 in the cover. The cover 16 is mechanically and electrically attached to the base 14 at pivot joints 24 and 24A, so that the cover 16 can pivot between a closed position (not shown) through the partially opened position shown in FIG. 2, to a fully opened position (not shown). A liquid crystal display (LCD) screen 20, is mechanically connected to the inner side of the cover 16 and is electrically connected to the electronic circuit 18. The electronic circuit 18 is stored within the lower case 14 or within the cover 16, or partially stored within both of them. The electronic circuit 18 includes an electronic processor and electronic memory.

Figure 2:
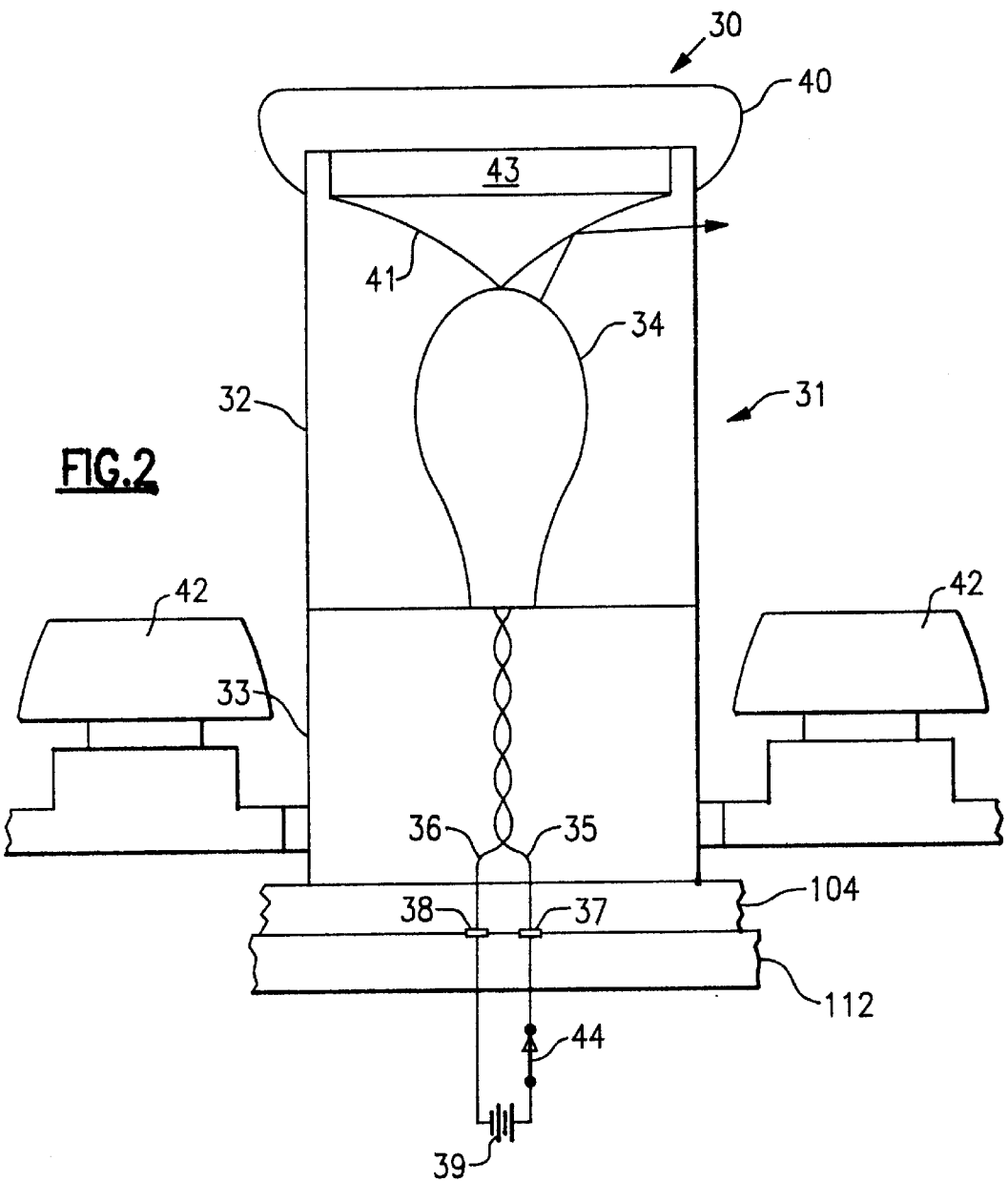
FIG. 2 is a diagram of a pointer in accordance with the present invention.

The pointing device 30 shown in FIG. 1 is electrically connected to the electronic circuit 18 to move a cursor across the LCD screen 20. As shown in FIG. 2, the pointing device 30 of the present invention includes a cylindrical shaft 31 with a transparent portion 32 and an opaque portion 33. Set within the cyclindral portion is an LED 34. Electrical connections 35 and 36 in the opaque portion 33 connect the LED 34 to electrical contacts 37 and 38 on the underside of a base plate 104 carrying the shaft 31. The contacts 37 and 38 make electrical connection to electrical contacts embedded in a canted pallet 112 on which the base plate 104 rides as the cover is opened and closed. As shown, the pointing device is in its operative position and electrically activated by source 39 through switch 44. The switch 44 is provided to deactivate the LCD 34 when there is sufficient ambient light and the LCD light is obtrusive. The switch can be a mechanical switch 45 on the body of the laptop or can be activated by cursor or key selection.

The top of the shaft 31 is covered by a roughened cap 40 which not only functions as a contact surface for operating the pointing device, but as a light shield preventing light from exiting the shaft through its top and interfering with viewing of the screen 20 by a user. In this embodiment, a conically shaped convex lens 41 to direct the light out laterally over the surface of the keys 42 of the laptop keyboard. The lens 41 may be formed by providing a silvered surface on a cavity 43 in a potting compound encapsulating the LED 34.

As pointed out above, the pointing device 30 is shown in FIG. 2 in its raised and operative position so that light is provided to the keyboard 28. In keyboards where height of the pointer is not a problem, the operative or raised position of the pointer can be permanent. However in laptops and other portable devices that have tops that contain viewing screens, the height of the pointing device would have to be accommodated by the thickness of the laptops case otherwise, the top of the pointing device will press upon the laptop screen 20 possibly damaging the screen and/or the pointing device. An elevating and lowering mechanism for a pointing device of a portable PC is shown in U.S. Pat. No. 5,708,562, the contents of which patent are hereby incorporated by reference. This mechanism automatically elevates and lowers the operating end for a pointing device on concert with the relative position of the cover 16 of the case.

Figure 3:
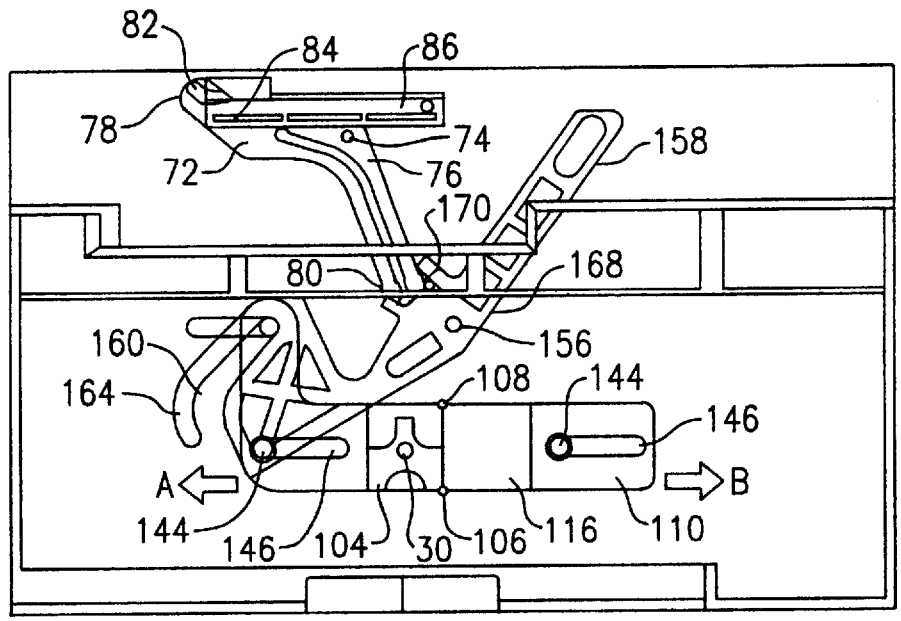
FIGS. 3 and 4 are diagrams of a mechanism for raising and lowering the pointer in response to opening and closing of a laptop cover.
Figure 4:
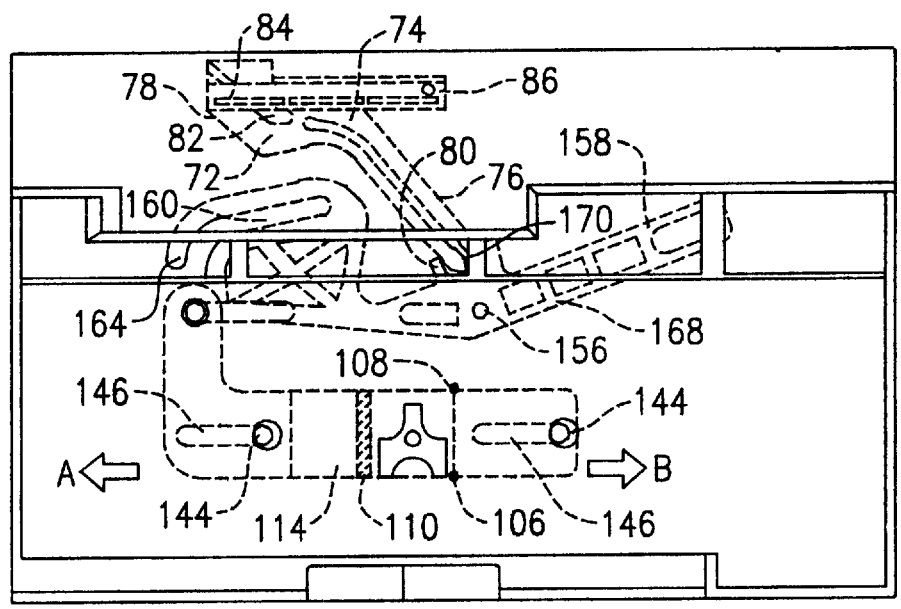
Figure 5:
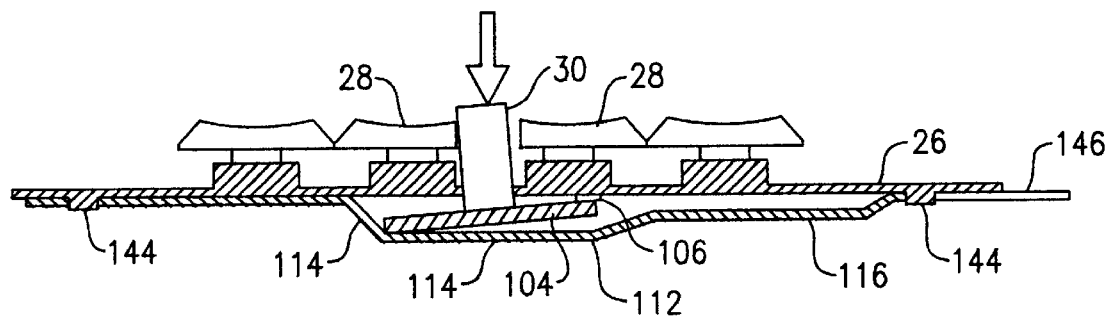
FIGS. 5 and 6 are sectional views of a carrier for the pointer responsive to the mechanism for raising or lowering the pointer.
Figure 6:
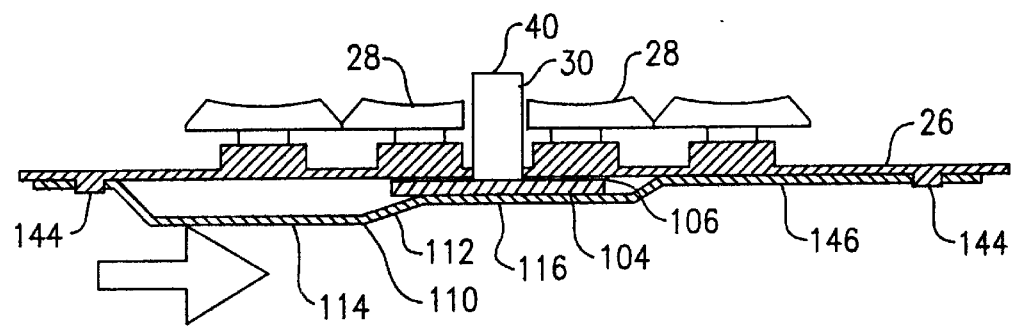

Referring to FIGS. 3 and 4, a first drive arm 158 in this embodiment has an end portion 164, in which is formed a guide slot 160, and a central connection area 168, in which is formed a socket area 170. The central connection area 168 is held to the lower case 14 by a pivot pin 156 around which it pivots. The guide slot 160 is formed in an appropriate shape so that in conjunction with a clearance slot 146 it can provide a desired operation of an arm 110 in the case. The base portion 104, which fixed in place the point device 30, is connected at the right side to the keyboard 26 by means of the hinges 106 and 108, as can best be seen in FIGS. 5 and 6. As shown in FIGS. 5 and 6, an opening is contained in the keyboard 26 to permit the operated end of the pointing device 30 to extend upward. Referring back to FIGS. 3 and 4, the elevating and lowering mechanism in this embodiment includes a second drive arm 72. The second drive arm 72 is installed on the system 12 and is held by a pivot 74 so that it freely pivots. The second drive arm 72 has a first end portion 76 and a second end portion 78. At the distal end of the first end portion 76 is formed a ball section 80 that is inserted into the socket 70 in the first drive arm 158 so as to set it in the operating state. In the second end portion 78 is formed a cam slot 82 with a cam pin 84 inserted therein. The cam pin 84 reduces the influence of friction and provides a smoother operation in the slot 82.

Figure 7:
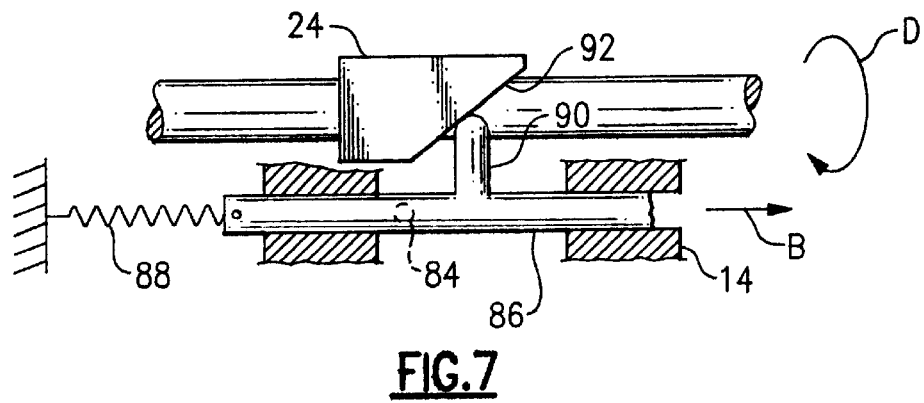
FIG. 7 is a side view of a cam device to activate the mechanism of FIGS. 3 and 4.

Referring to FIG. 7, the dam pin 84 is extended downward from a cam slider 86. The cam slider 86 is so installed in the system 12, parallel to the rotary shaft of the cover 16, that it is slidable. The cam slider 86 is biased to the left by a tension spring 88. On the cam slider 86 is a rider section 90 that contacts a cam surface 92 of the left pivot joint 24A by which the cover 16 is attached to the system 12. When the cover 16 is to be pivoted and thus closed from the opened position, the pivot joint 24A rotates as is indicated by the arrow D. Then, the cam surface 92 is driven against the rider section 90, the cam slider 86 is shifted to the right, as is indicated by the arrow B, and the tension spring 88 is stretched. When the cover 16 is to be pivoted from the closed position to the open position, the pivot joint 24A rotates the opposite direction. The tension spring 88 pulls the cam slider 86 in the direction that is the opposite of the direction B as the rider section 90 moves along the cam surface 92 to place the keyboard in the operating position. The force that is exerted to arrange the keyboard is only the force that is generated by the tension spring 88. This structure protects the internal mechanism when the extension of a pallet is interrupted in a third embodiment, which will be described later. This arrangement is therefore preferable for driving the cam slider 86 directly into the cover at the extended operating position.

A shifting mechanism, and the movement of the pallet from the storage position to the operating position will now be described. In FIG. 3 is shown an elevating and a lowering mechanism at the storage position. In this embodiment, the first drive arm 158 is so held by the pivot pin 156 that it can be pivoted. On the first drive arm 158 is the end portion 164 in which is formed the guide slot 160, and the central connection area 168 in which is formed the socket area 170. The central connection area 168 is so fitted around the pivot pin 156 that it can be freely pivoted.

As is described above, in FIG. 3 is shown the storage positions of the components when the cover 16 is closed. In this condition, the cam slider 86 and the cam pin 84 are positioned completely to the right by the cam surface 92 of the pivot joint 24A, which acts on the rider section. In the illustration in FIG. 4, which is a schematic diagram, as is in FIG. 3, are depicted components when the cover 16 is pivoted and opened. As is apparent from the comparison of the diagrams in FIGS. 3 and 4, the cam pin 84 is shifted to the left. Thus, the second drive arm 72 pivots as in indicated by the arrow E because the center section of the cam slot 82 is formed with an angle. Since the pivot 74 is fixed to the base 14, the first end portion 76 of the second drive arm 72 rotates the first drive arm 158 in the direction F. Due to the interaction with the guide slot 160 for the first drive arm 158, the arm 110 is driven by the first drive arm 158 in the horizontal direction indicated by B. The first drive arm 158 pivots around the pivot pin 156, while the ball section 80 of the second drive arm 72 pivots within the socket area 70 in the first drive arm 58.

As is shown in FIGS. 5 and 6, as the arm 110 is shifted in the horizontal direction A, the base portion 104 is driven upward by a second shelf portion 116 via a sloped portion 112, and the operation section of the pointing device 30 is lifted. It is only in this raised position that an electrical connection is made to the source 39. Thus, the pointer is darkened when the pointer 30 is retracted. It is preferable that a positioner, such as a leaf spring, or an indentation that corresponds in shape to the base portion 104, be provided for the second shaft portion 116 in order to prevent the pointing device from wobbling while it is being manipulated. It is desirable that the pointer 30 have a mechanical failure load that is greater than approximately 3.624 Kg (8 pounds). Although, in the first embodiment the base portion 104 is connected to the keyboard 26 by means of the hinges 106 and 108, a flexible member, such as a compression coil spring or a leaf spring, can be employed to connect the base portion 104 to the keyboard 26.

The shifting of the pallet from the storage position to the operating position has been explained. To move the pallet from the operating position to the storage position, a user merely closes the cover. The elevating and lowering mechanism then automatically moves the arm 110 inversely. As the arm 110 is shifted in the horizontal direction B, the base portion 104 is moved to the first shaft portion 114 across the sloped portion 112, and as a result, the operating section of the pointing device 30 is lowered.

While one illustrated example of the present invention has been explained, a number of modifications can be made without departing from the spirit and scope of the invention. For instance, the described mechanisms for raising and lowering the pointed can be replaced with other mechanisms of various shapes and types, such as electrically activated mechanisms. Further, the elevating and lowering mechanism that is related to the present invention can be also incorporated in keyboards of the other types of computers. In addition, components or materials of arbitrary sizes, shapes and types can be employed. Therefore, it should be understood that the invention is not limited to the disclosed embodiments but should be construed in accordance with the spirit and scope of the accompanying claims.

What is claimed is:

1. A portable computer comprising:

a system body;

a cover attached by pivot joints to said system body so that the cover can be opened and closed;

a keyboard on the top face of said system body;

a pointing device having an operating end containing a light source which pointing device is located among a plurality of input keys in the keyboard, wherein said pointing device comprises an LED within a clear tubular shaft which shaft has an opaque top;

an elevating and lowering device for raising said operating end higher than said plurality of input keys when said portable computer is to be operated, and for lowering said operated end when the portable computer is not to be operated wherein said elevating and lowering device includes means which interacts with opening and closing of said cover to elevate and lower said operating end; and an electric circuit for energizing the light source while the pointing device is in the elevated position whereby light is provided to the keyboard of the portable computer.

2. The portable computer of claim 1, wherein the opaque top contains a roughened surface.

3. The portable computer of claim 1, wherein the electric circuit includes electrical connections to the LED in the lower end of tubular shaft.

4. The portable computer of claim 1, wherein said elevating and lowering mechanism includes a canted pallet with electrical contacts to make connection to the electrical connection to the LED only when the pointing device is in its raised position.

5. The portable computer of claim 1 including a conically shaped concave reflecting surface between the opaque top and the LED to reflect light outwardly across the surface of the keyboard.

6. The portable computer of claim 5, wherein said LED is encapsulated in a clear plastic resin and said reflecting surface is a silvered surface of a cavity within the encapsulating plastic.

7. The portable computer of claim 4, including a user operated mechanism for turning the LED on or off while the LED is in its raised position.

8. The portable computer of claim 7, wherein the user operated mechanism is mouse or keyboard initiated.

9. A computer keyboard having a pointing device positioned within keys in the keyboard being characterized by the pointing device having an LED within a clear tubular shaft with an opaque top for front lighting the keys of the keyboard.

10. The computer keyboard of claim 9, wherein the opaque top contains a roughened surface.

11. The computer keyboard of claim 9, wherein the electric circuit includes electrical connections to the LED in the lower end of tubular shaft.

12. The portable computer of claim 9, wherein said keyboard contains elevating and lowering mechanism that includes a canted pallet with electrical contacts to make connection to the electrical connection to the LED only when the pointing device is in its raised position.

13. The computer keyboard of claim 9 including a conically shaped concave reflecting surface between the opaque top and the LED to reflect light outwardly across the surface of the keyboards.

14. The portable computer keyboard of claim 13, wherein said LED is encapsulated in a clear plastic resin and said reflecting surface is a silvered surface of a cavity within the plastic resin.

15. The computer keyboard of claim 12, including a user operated mechanism for turning the LED on or off while the LED is in its raised position.

16. The portable computer of claim 15, wherein the user operated mechanism is one of a mouse and a keyboard.

* * * * *